May 30, 1967 R. FORMAN ET AL 3,322,977

THERMIONIC CONVERSION PROCESS AND APPARATUS

Filed March 20, 1962 5 Sheets-Sheet 1

INVENTORS
RALPH FORMAN
JOHN A. GHORMLEY
ROBERT L. CUMMEROW

BY [signature]
ATTORNEY

THERMIONIC CONVERSION PROCESS AND APPARATUS

Filed March 20, 1962 5 Sheets-Sheet 2

INVENTORS
RALPH FORMAN
JOHN A. GHORMLEY
ROBERT L. CUMMEROW
BY John F. Hohmann
ATTORNEY

THERMIONIC CONVERSION PROCESS AND APPARATUS

Filed March 20, 1962 5 Sheets-Sheet 3

INVENTORS
RALPH FORMAN
JOHN A. GHORMLEY
ROBERT L. CUMMEROW
BY John F. Hohmann
ATTORNEY INVENTORS
RALPH FORMAN
JOHN A. GHORMLEY
ROBERT L. CUMMEROW
BY John F. Hohmann
ATTORNEY INVENTORS
RALPH FORMAN
JOHN A. GHORMLEY
ROBERT L. CUMMEROW
BY John F. Holmann
ATTORNEY 3,322,977
THERMIONIC CONVERSION PROCESS AND APPARATUS Ralph Forman, Rocky River, John A. Ghormley, Bay Village, and Robert L. Cummerow, Lakewood, Ohio, assignors to Union Carbide Corporation, a corporation of New York Filed Mar. 20, 1962, Ser. No. 182,707
7 Claims. (Cl. 310—4)

This application is a continuation-in-part of copending application Ser. No. 147,593, filed Oct. 25, 1961, and now abandoned.

The present invention relates generally to a process and apparatus for converting heat energy to electrical energy and, more particularly, to a process and apparatus for converting heat energy directly to electrical energy by effecting thermionic emission from a hot body while producing ions in the gas surrounding the hot body.

Heretofore, it has been proposed to convert heat energy to electrical energy by using a gas having a very low ionization potential with a hot electron-emitting material which has a work function higher than the ionization potential of the gas. Such a process is employed in the conventional cesium thermionic converter, wherein heat energy is converted directly to electrical energy by utilizing cesium gas, which has a very low ionization potential (3.8 ev.), in conjunction with a hot tungsten cathode, which has a work function (4.6 ev.) higher than the ionization potential of the cesium gas and thus effects ionization of the cesium gas. The general operating principle for the cesium thermionic converter is that the ionized cesium produced by the hot filament neutralizes the space charge which is ordinarily responsible for inhibiting thermionic emission from the hot filament. Although the operating principle of such a cesium thermionic converter is a sound one, effective electron emitters usually have low work functions, and a relatively small number of gases have such low ionization potentials. Thus, relatively few gases are suitable for use in such devices. Also, gases having low ionization potentials are often chemically active and difficult to contain in a closed system.

More recently, it has been found that cesium gas can be ionized, even when the work function of the cathode is slightly below the ionization potential of the cesium, by employing high cathode temperatures (between about 1500 and about 3000° C.) and maintaining the cesium at a pressure between about 0.1 and about 2.0 mm. of mercury. However, the pressure of cesium required in such a device necessitates operating at relatively high ambient temperatures which, combined with the high chemical activity of cesium, makes construction of the device considerably more difficult. Also the cathode in such a device has a relatively short life.

It has also been found that the space charge surrounding a very hot cathode can be neutralized by surrounding the cathode with a rare gas. However, such a process usually requires very high cathode temperatures. It has also been found that cesium gas can be ionized at a relatively low partial pressure in a rare gas, but this still requires the use of chemically active cesium.

Another recent discovery is that fission recoil particles from a uranium-bearing cathode can be used to ionize a noble gas in a thermionic diode within a nuclear reactor. Such a device is described in the Journal of Applied Physics, vol. 30, at page 2017 (1959). However, some serious problems would be expected in such a device. For example, some of the fission products could act as cathode poisons. Also, the short range of the fission recoil particles requires that the fissionable material be essentially on the surface of the cathode, thus restricting the choice of cathode materials. Further, problems of mechanical weakness and volatility at high temperatures would be expected in materials which are suitable electron emitters and contain high concentrations of fissionable atoms.

It is, therefore, the main object of the present invention to provide a thermoelectric conversion process and apparatus wherein the thermionic work function of the cathode may be higher or lower than the ionization potential of the surrounding gas, a relatively low cathode temperature may be employed, and no fissionable material is required on the surface of the cathode.

It is another object of the invention to provide such a process wherein the gas to be ionized is not necessarily chemically active.

It is a further object of the invention to provide such a process and apparatus wherein the cathode has a relatively long life.

A still further object of the invention is to provide an improved process and apparatus for varying space charge effects near a hot cathode so as to vary the electron current obtainable therefrom.

Other aims and advantages of the invention will be apparent from the following description and appended claims.

As used herein, the term "°C." as applied to temperature figures over 800 refers to °C. brightness as measured by an optical pyrometer.

Figures 1, 2:
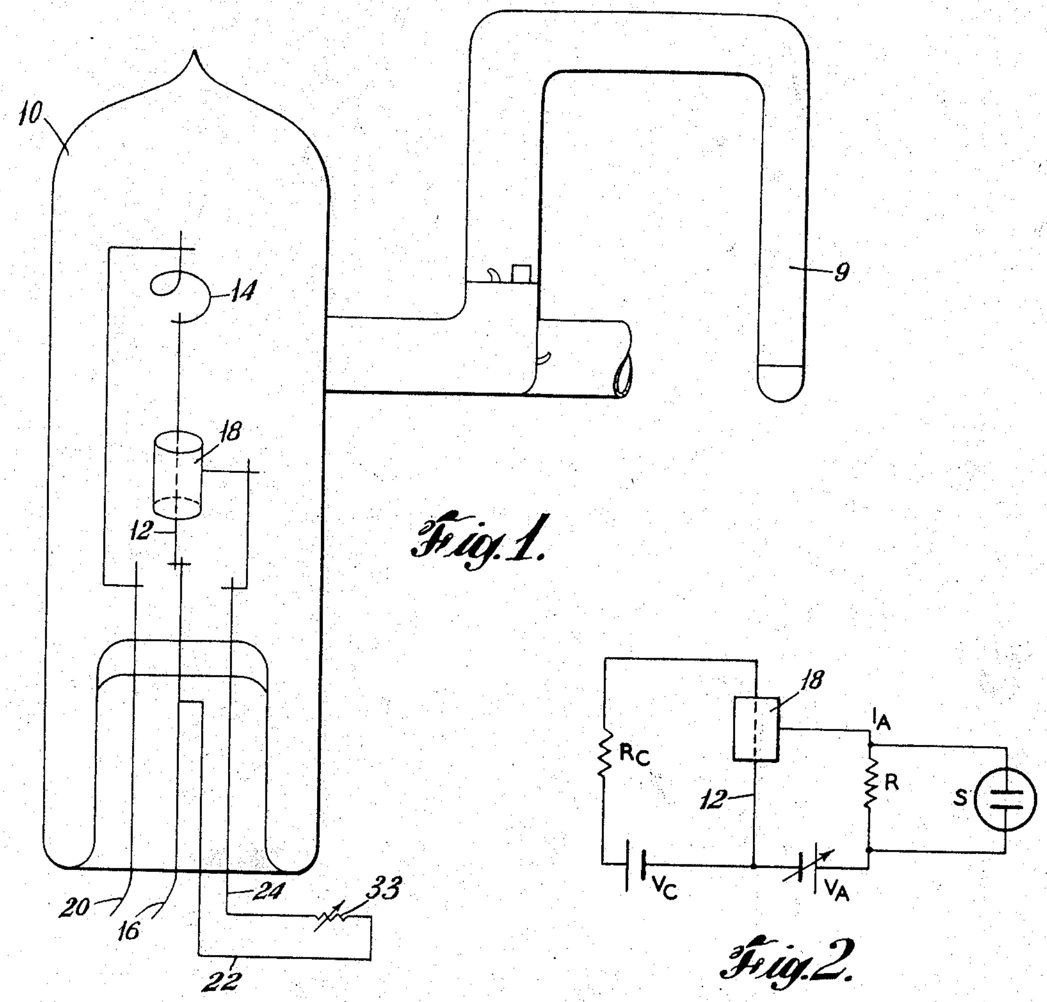
FIG. 1 is a schematic diagram of experimental apparatus for carrying out the inventive process.
FIG. 2 is a diagram of circuit for determining when the space charge has been neutralized in the apparatus of FIG. 1.

In accordance with the present invention, there is provided a thermionic converter comprising a cathode and an anode disposed in an ionizable gas, the cathode having a thermionic work function greater than the thermionic work function of the anode and being electrically connected to the anode through an external load circuit, the temperature of the cathode being sufficiently high to effect thermionic emission therefrom and the temperature of the anode being below the temperature of the cathode and sufficiently low that the thermionic emission from the anode is negligible in comparison with the thermionic emission from the cathode; and a source of ionizing radiation for irradiating the ionizable gas with at least one type of charged particles selected from the group consisting of beta particles, protons, deuterons, tritons, alpha particles, and high energy electrons, the pressure of the ionizable gas and the dose rate of the ionizing radiation being sufficient to produce an ion concentration sufficiently high to make the current output of the converter temperature dependent.

The ionizing radiation employed in the present invention may be produced by any convenient process. For example, beta particles may be obtained from beta decay of a radioactive nuclide such as krypton-85, and high energy electrons may be obtained from gamma radiation as a result of the photoelectric process, Compton scattering, or pair production. High-energy protons or deuterons may be produced as a result of collisions of fast neutrons in a nuclear reactor with hydrogen or deuterium. High-energy protons and tritons may be produced in a nuclear reactor by the absorption of slow neutrons in a material having nuclei with a high cross section for an n,p or n,alpha reaction. Alpha particles may be obtained from alpha decay of radioactive nuclides such as radon.

The rate of formation of gas ions in the space between the cathode and anode is determined mainly by the pressure and type of the ionizable gas around the cathode and anode, and the dose rate of the ionizing radiation, i.e., the energy, type, and flux of ionizing particles employed. The concentration of ions is also dependent on the rate of recombination. By varying these factors, the ion concentration in the gas around the cathode can be increased to the level required to make the current output of the converter temperature dependent, and a cathode operating at a relatively low temperature can be employed. In general, the ion concentration increases with increasing gas pressure, increasing dose rate, and decreasing rate of recombination. When the range of the ionizing particles exceeds the dimensions of the vessel, the ion concentration is somewhat dependent on the geometry of the vessel.

After the ion concentration has been increased sufficiently to cause the current output of the converter to be temperature dependent, the output can be increased even further by continuing to increase the dose rate of the ionizing radiation and/or the pressure of the ionizable gas. The current obtainable by the present process in a given device is higher than the current obtainable with a vacuum in the same device. However, it is generally preferred to have the source of ionizing radiation in the form of a gas between the cathode and the anode. The radiating gas may itself be the ionizable gas, or it may be mixed with other ionizable gases. Also, more than one type of radioactive gas may be employed.

One source of ionizing radiation suitable for use in the present invention is a source of slow neutrons, such as a nuclear reactor, in combination with a material having nuclei with a high cross section for an n,p (neutron in, proton out) reaction or n,alpha (neutron in, alpha particle out) reaction. Examples of such materials are boron-10, lithium-6, and helium-3. The boron and lithium are solids and may be disposed within the ionizable gas in the diode in the form of a coating on the anode or on the inner walls of the diode container. Such coatings may be formed, for example, by electroplating. The boron-10 or lithium-6 need not be used in elemental form, but may be contained in a suitable compound, such as $TiB_2$. Helium-3 is a gas and may be mixed with the ionizable gas, preferably in an amount such that the resulting gas mixture contains less than about 10% by volume helium-3. Absorption of slow neutrons from the reactor or other neutron source in helium-3, for example, produces high-energy protons and tritons with kinetic energies of about 0.6 mev. and 0.2 mev., respectively. In a reactor having a slow neutron flux of $10^{12}$ neutrons/cm.$^2$-sec., pure helium-3 at a pressure of one atmosphere in a container having a radius greater than the 6-cm. range of the protons would be subjected to a dose rate of $4 \times 10^{10}$ rads per hour (in the center of the container) from the products of the n,p reaction. With identical conditions in a vessel having a radius of one centimeter, the dose rate would be about $10^{10}$ rads per hour and the rate of ion formation would be $10^{15}$ ions/cc.-sec. A dose rate of 0.1 to 10,000 megarads per hour is usually sufficient to make the current output temperature dependent. It is preferred to use a rare gas, such as krypton, as the ionizable gas, and the preferred pressure range for the ionizable gas is from about 0.1 to about 200 millimeters of mercury. Although helium-3 is referred to herein as a source of ionizing radiation, it is to be understood that helium-3 becomes a source of ionizing radiation only when used with a neutron flux from a nuclear reactor to give the n,p reaction.

Another source of ionizing radiation suitable for use in the present invention is fission-product krypton. As used herein, the term "fission-product krypton" refers to a gas containing about 5% by volume krypton-85 and about 95% by volume stable fission-product krypton isotopes when fresh. Of course, as the fission-product krypton becomes older, the proportion of krypton-85 therein slowly decreases. The krypton-85 decays to rubidium-85, which is a stable isotope of rubidium. In cases where the anode temperature is sufficiently low to permit the rubidium-85 to deposit thereon without being driven off, the rubidium-85 may be used to lower the work function of the anode. The fission-product krypton serves both as the ionizable gas and as the source of ionizing radiation (beta particles). Fission-product krypton is a relatively abundant and easily isolated fission product having a specific activity of 21 curies per gram when fresh. Krypton-85 is a nearly pure (99.4%) beta emitter with a half-life of 10.5 years. When fresh fission-product krypton is employed in the present invention, a gas pressure of at least 10 mm. of mercury is usually required to produce a concentration of gas ions sufficient to reduce the space charge around a cathode (in the center of a vessel having a radius greater than the range of the beta particles) sufficiently to cause the current output of the diode to be temperature dependent.

Another source of ionizing radiation suitable for use in the present invention is radon, which is an alpha-emitting gas. About 1.0 millicurie of radon 222 and its short-lived decay products in natural krypton at a pressure of about 20 mm. of mercury produces a concentration of gas ions sufficient to reduce the space charge around a cathode (in the center of a vessel having a radius greater than the range of the alpha particles) sufficiently to make the current output of the diode temperature dependent.

Still another source of ionizing radiation is a source of gamma rays, such as cobalt-60 or a nuclear reactor, in combination with a diode filled with a rare gas. Absorption of gamma rays from the cobalt-60 or reactor in the walls (such as glass) and electrodes of the diode produces high-energy electrons which, in turn, ionize the rare gas within the diode. In this embodiment, the gamma-ray source may be located completely outside the gas to be ionized. It is preferred to have the dose rate from the high-energy electrons at least as great as 0.05 megarad per hour. There is apparently no upper limit for the dose rate, but as a practical matter there is no need to increase the dose rate beyond the level which produces the maximum current which the electrodes can carry. The krypton or other rare gas within the diode should be at a pressure of 1 to 200 millimeters of mercury. The efficiency of the device is generally higher at the higher dose rates.

An suitable electron-emitting material may be employed as the cathode in the present invention, regardless of whether its work function is greater than, equal to, or less than the ionization potential of the particular ionizable gas or gases employed. Typical examples of suitable cathode material are thoriated tungsten, which has a work function of 2.6 ev., and porous tungsten containing embedded barium aluminate, which has a work function of 2.12 ev. These two materials are excellent emitters and can operate at relatively low temperatures. In order to obtain an output voltage from the inventive converter, the cathode must have a thermionic work function greater than that of the anode and must be electrically connected to the anode through an external load. When either of the two cathode materials mentioned above is employed, the anode material may be an oxide cathode material (e.g., nickel coated with porous barium oxide-strontium oxide, which has a work function of about 1.0 ev.) Other suitable anode materials are nickel or tungsten coated with cesium or rubidium. The anode temperature must be continuously maintained below the temperature of the cathode and sufficiently low that the thermionic emission from the anode is negligible in comparison with the thermionic emission from the cathode; the relative temperatures of the cathode and anode are preferably such that the thermionic emission from the anode is less than about 0.1% of the emission from the cathode. The only requirement on the cathode temperature is that it be sufficiently high to achieve effective thermionic emission therefrom. Although the spacing between the cathode and anode is not critical to the operability of the present invention, the efficiency of the process may be varied to some degree by varying the spacing.

In addition to the ions produced by ionizing radiation, there may be some gas ions produced by thermal ionization.

An experimental embodiment of the inventive process and apparatus will now be described by referring to the drawings.

A schematic view of the experimental apparatus is shown in FIG. 1. A radioactive gas is contained at the required pressure in a Pyrex glass envelope 10. A cathode filament 12 is disposed within the gas and is supported at the top by a tantalum spring 14 and electrically conductive lead 20 and at the bottom by an electrically conductive lead 16. The cathode 12 is heated to the temperature required to achieve effective thermionic emission therefrom by an electrical current passed through leads 16 and 20 from an external power source (not shown). An anode 18 surrounds the cathode filament 12 in the form of a cylindrical sleeve. Lead 22 from the cathode and lead 24 from the anode connect the generator to an external load circuit 33.

In order to determine the exact gas pressure and dose rate required to make the current output of the device of FIG. 1 temperature dependent, the device is placed in the circuit shown in FIG. 2. Referring to FIG. 2, $V_c$ is the voltage required to heat the cathode 12 and is connected across the cathode through a resistance $R_c$ with the polarity shown. A variable voltage $V_A$ is then connected across the anode 18 through a load resistance R, and the resulting current $I_A$ is measured as $V_A$ is varied. By plotting the $I_A$–$V_A$ characteristics at increasing gas pressures and/or dose rates, it can be determined at what pressure and dose rate the characteristic becomes temperature dependent. The current output may then be further increased by continuing to increase the gas pressure and/or the dose rate. An oscilloscope S may be connected across the load for use in determining the required impedance of the load.

Figure 3:
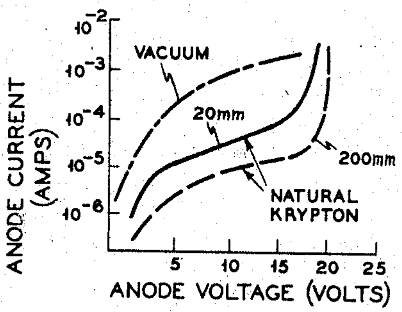
FIG. 3 is a graph showing the anode current-anode voltage characteristics obtained with a vacuum and various pressures of natural krypton gas in the apparatus of FIG. 1 with the work function of the anode greater than the work function of the cathode.

In an example of the aforedescribed process for determining the gas pressure and dose rate required to make the output temperature dependent, a tube such as that shown in FIG. 1 was prepared using a thoriated tungsten cathode filament and a tantalum anode sleeve. The tube was about 6 inches long and about 40 mm. in diameter with the electrodes located in the center of the tube. The tube was placed in the circuit shown in FIG. 2 and the anode current-anode voltage characteristic was taken both in a vacuum and in various pressures of natural krypton. The temperature of the cathode was about 1550° C., while the temperature of the anode was less than 500° C. The spacing between the cathode and anode was about 0.5 cm. The curves obtained are shown in FIG. 3. The ordinate in FIG. 3 is the current $I_A$ indicated in the circuit shown in FIG. 2, and the abscissa is the voltage $V_A$ indicated in FIG. 2. Each of the curves obtained with the vacuum and the natural krypton was independent of filament temperature (space charge limited) over a range of 1550 to 1750° C.

Figure 4:
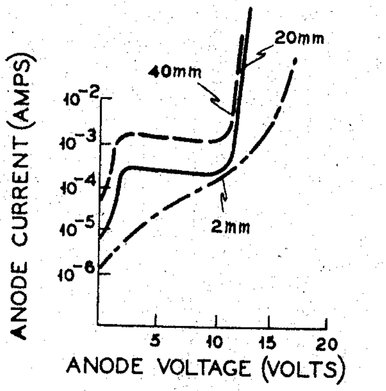
FIG. 4 is a graph showing the anode current-anode voltage characteristics obtained with various pressures of fission-product krypton in the apparatus of FIG. 1 with the work function of the anode greater than the work function of the cathode.
Figure 5:
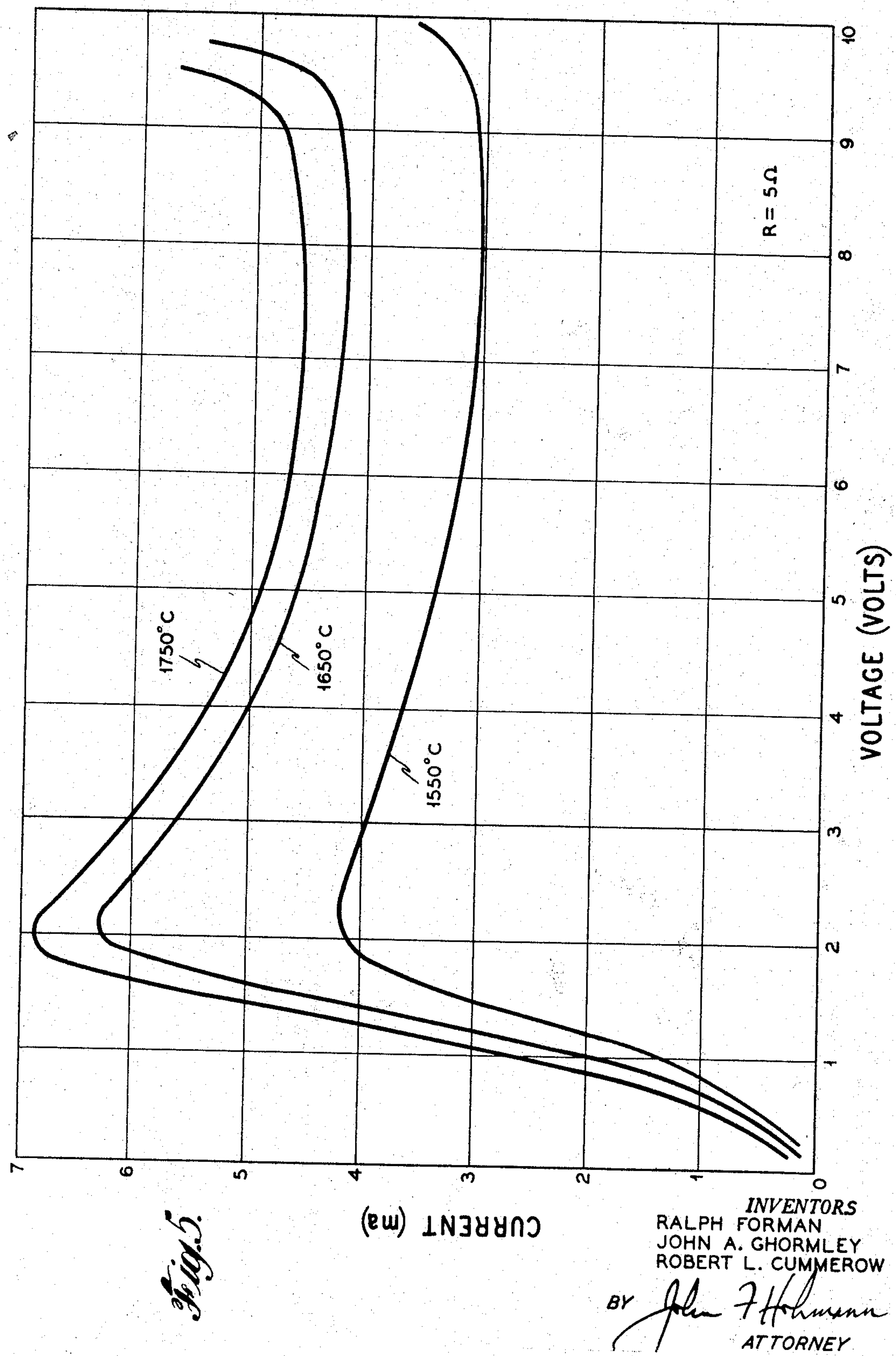
FIG. 5 is a graph showing the anode current-anode voltage characteristics obtained at various filament or cathode temperatures with fission-product krypton in the apparatus of FIG. 1 at a pressure of 40 mm. with the work function of the anode greater than the work function of the cathode.

The tube was then evacuated, filled with radioactive fission-product krypton, and placed in the same circuit. The cathode and anode temperatures and the spacing between the cathode and anode were the same as when the vacuum and ordinary krypton were employed. Anode current-anode voltage characteristics were again taken at various pressures and various temperatures at each pressure; the gas pressure was varied by varying the temperature around a cold finger, such as 9 in FIG. 1. The anode current-anode voltage curves obtained for the fission-product krypton are shown in FIG. 4. It can be seen from the curves that the current output increased with increasing pressures of fission-product krypton gas. Moreover, at pressures of 20 mm. and above, the curves became temperature dependent. The temperature dependence of the $I_A$–$V_A$ curve at a pressure of 40 mm. is shown in FIG. 5 over the range of 1550° C. to 1750° C. This shows that the inhibiting space charge surrounding the cathode was effectively neutralized by the inventive process; the beta emission from the $Kr^{85}$ at pressures of 20 mm. and above increased the ion concentration sufficiently to at least partially neutralize the space charge, thereby permitting more electrons to flow. The 2-mm. curve in FIG. 4 was still temperature independent because the ion concentration at that pressure did not sufficiently neutralize the space charge. At the pressure of 40 mm. of mercury, there were about two curies of $Kr^{85}$ in the tube, and the dose rate was about 0.10 megarad per hour; at a pressure of 20 mm. of mercury, there was about one curie of $Kr^{85}$ in the tube, and the dose rate was about 0.025 megarad per hour. No output current was produced at $V_A=0$ because the tantalum anode had a work function (4.0 ev.) greater than that of the thoriated tungsten cathode (2.6 ev.).

Figure 6:
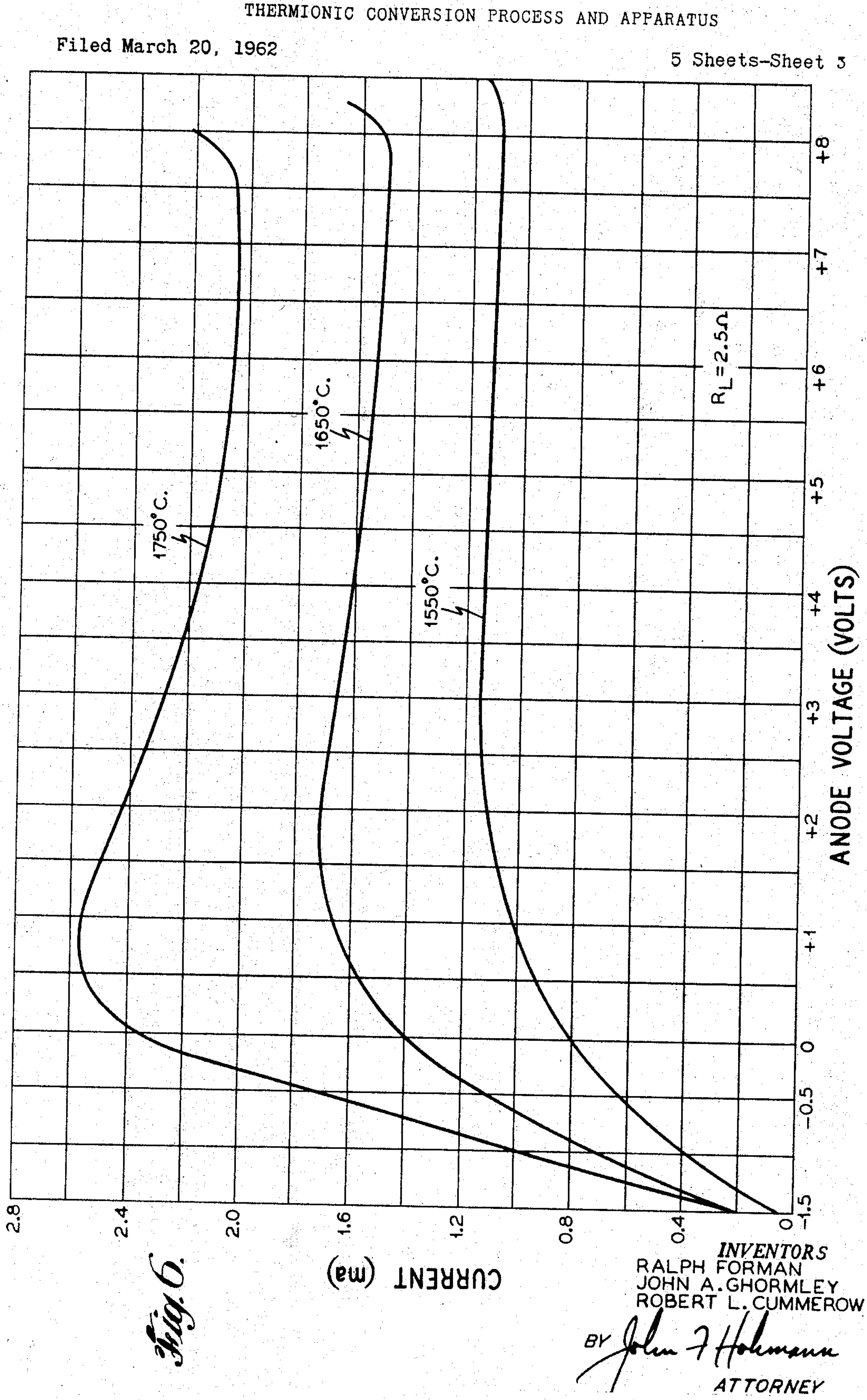
FIG. 6 is a graph showing the anode current-anode voltage characteristics obtained at various filament or cathode temperatures with fission-product krypton in the apparatus of FIG. 1 at a pressure of 120 mm. with the work function of the anode less than the work function of the cathode.

After it had been determined that the fission-product krypton at a pressure of at least 20 mm. of mercury would make the current output temperature dependent, the tantalum anode was replaced with an anode of oxide cathode material. Since the oxide cathode material had a work function (1.0 ev.) well below that of the cathode (2.6 ev.), as opposed to the 4.0-ev. work function of the tantalum anode, the device could now produce an output current in the absence of an applied voltage, i.e., at $V_A=0$. In order to illustrate the operation of the device as a generator, it was again placed in the circuit of FIG. 2 and the $I_A$–$V_A$ characteristic taken at various pressures and temperatures. The curves obtained with the fission-product krypton gas at a pressure of 120 mm. of mercury over a temperature range of 1550 to 1750° C. are shown in FIG. 6. It can be seen from the curves of FIG. 6 that a substantial current was produced at $V_A=0$. Also, the output was temperature dependent, which shows that the space charge surrounding the cathode was substantially neutralized. Results similar to those described above for the thoriated tungsten cathode and tantalum anode were obtained with an oxide cathode filament and a tantalum anode.

Figure 8:
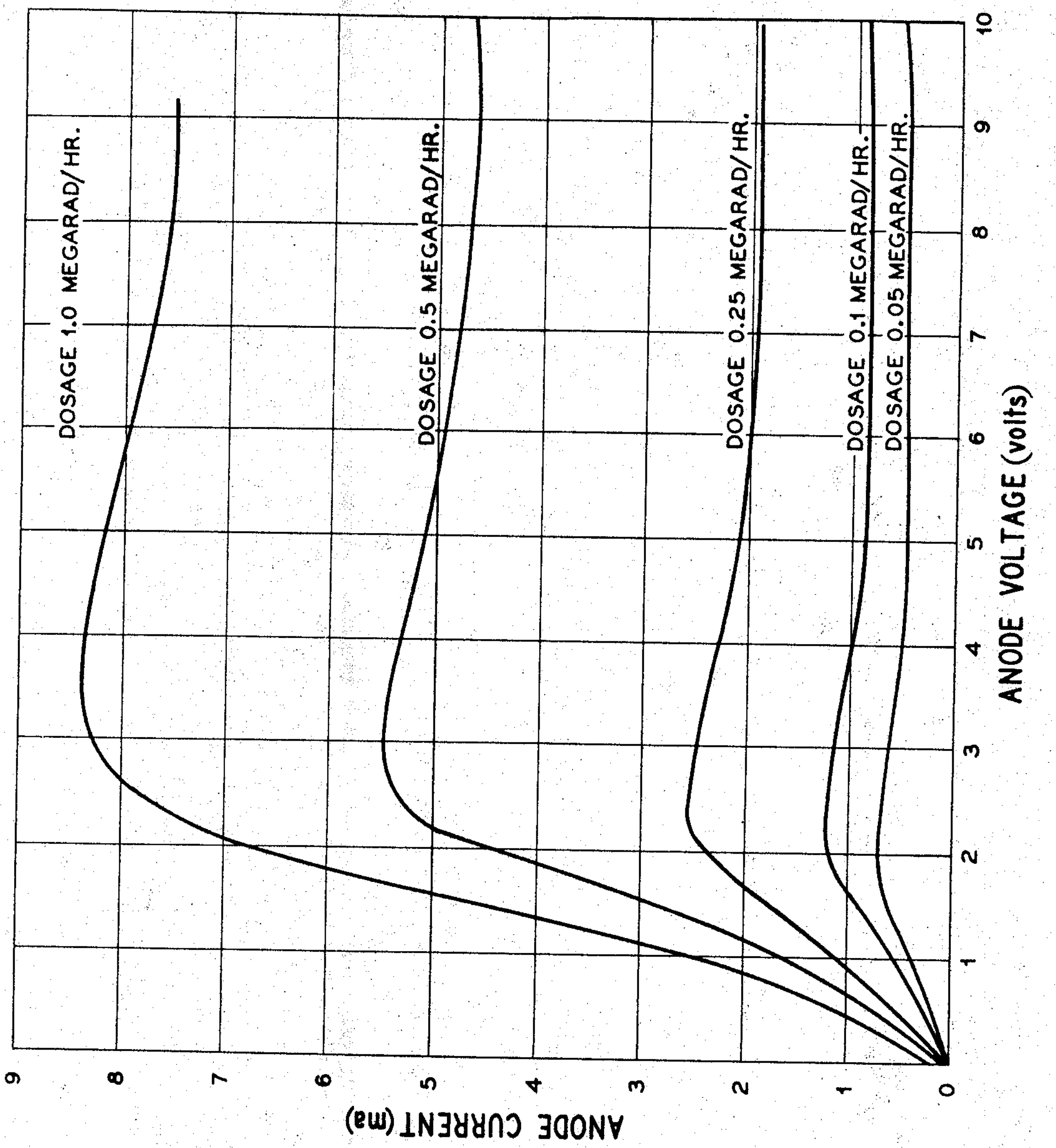
FIG. 8 is a graph showing the anode current-anode voltage characteristics obtained at various dose rates of ionizing electrons (produced by radiation from a cobalt-60 source) in natural krypton at a pressure of 80 mm. in the apparatus of FIG. 1.

In another example of the invention, a tube similar to that shown in FIG. 1 was prepared with a thoriated tungsten cathode (2.6 ev.) and a tantalum anode (4.0 ev.). The tube was filled with natural krypton gas at a pressure of 80 mm. of mercury and subjected to gamma rays from cobalt–60. The tube was then placed in the circuit shown in FIG. 2, and anode current-anode voltage characteristics were taken at various dose rates. The temperature of the cathode was about 1650° C. while the temperature of the anode was less than 400° C. The spacing between the cathode and anode was about 0.5 cm. The curves obtained are shown in FIG. 8. It can be seen from the curves that the current output increased with increasing dose rates. At dose rates up to 0.5 megarad/hr., the maximum current varied almost directly in proportion to the dose rate; between 0.5 and 1.0 megarad/hr., the increase in current was less than proportional to the increase in dose rate, indicating that the current was becoming plasma-limited.

Figure 7:
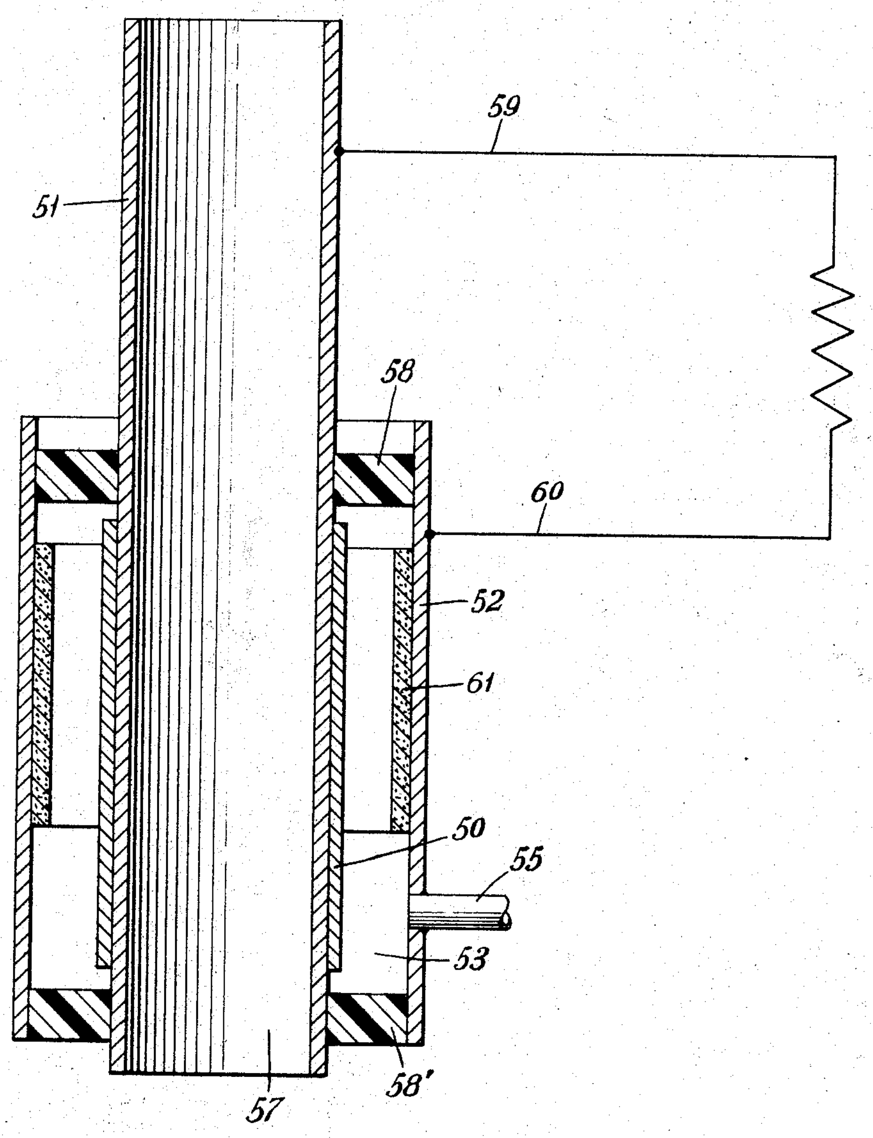
FIG. 7 is an elevation view in cross-section of a preferred embodiment of the inventive apparatus for carrying out the inventive process.

Another form of the inventive apparatus is shown in FIG. 7. This embodiment comprises a pair of concentric conductive cylinders 51 and 52 held in place by insulating end rings 58 and 58' so as to define an annular chamber 53. Affixed to the outer surface of the inner cathode support cylinder 51 is a cathode sleeve 50 of tungsten impregnated with barium aluminate (work function of 2.12 ev.). The chamber 53 is exhausted through tube 55 and then filled through the same tube with radioactive fission-product krypton at a pressure of at least 10 mm. of mercury. The cathode 50 is connected to an external load circuit through conductor 59 while the anode sleeve 61 (oxide cathode material on nickel) is connected to the same load circuit through conductor 60. The cathode 50 is heated by passing an appropriate hot fuel or gas through the tubular passageway 57. In order to maintain the anode 61 at a temperature below that of the cathode 50, the ambient temperature outside the outer cylinder 52 is maintained at a temperature below that of the hot gas in the passageway 57.

Alternatively, the chamber 53 could be filled with helium-3 mixed with a rare gas, and the entire apparatus placed in a reactor. In such a case, the cylinder 51 could be heated by a uranium fuel element. Similarly, the chamber 53 could be filled with a rare gas and a radioactive cathode or anode material employed. In these cases, the same procedure outlined above could be used to determine the gas pressure and dose rate required to make the current output temperature dependent.

While various specific forms of the present invention have been illustrated and described herein, it is not intended to limit the invention to any of the details herein shown, but only as set forth in the appended claims.

What is claimed is:

1. A thermionic converter comprising a cathode and an anode disposed in a gas emitting at least one type of ionizing radiation selected from the group consisting of beta particles, high energy electrons, protons, deuterons, tritons, and alpha particles, said cathode having a thermionic work function greater than the thermionic work function of said anode and being electrically connected to said anode through an external load circuit, the pressure of said gas and the dose rate of said ionizing radiation being sufficiently high to make the anode current-anode voltage characteristic temperature dependent; the temperature of said cathode being sufficiently high to effect thermionic emission therefrom and the temperature of said anode being below the temperature of said cathode and sufficintly low that the thermionic emission from said anode is negligible in comparison with the thermionic emission from said cathode.

2. The thermionic converter of claim 1 wherein said gas is fission-product krypton at a pressure of at least 10 millimeters of mercury.

3. The thermionic converter of claim 1 wherein said gas is radon.

4. The thermionic converter of claim 1 wherein said cathode is thoriated tungsten and said anode is oxide cathode material.

5. A process for thermionic conversion comprising disposing a cathode and an anode in a gas emitting at least one type of ionizing radiation selected from the group consisting of beta particles, high-energy electrons, protons, deuterons, tritons, and alpha particles, said cathode having a thermionic work function greater than the thermionic work function of said anode and being electrically connected to said anode through an external load circuit; increasing the temperature of said cathode sufficiently high to effect thermionic emission therefrom while continuously maintaining the temperature of said anode below the temperature of said cathode and sufficeintly low that the thermionic emission from said anode is negligible in comparison with the thermionic emission from said cathode; and increasing the pressure of said gas and the dose rate of said ionizing radiation sufficiently to make the anode current-anode voltage characteristic temperature dependent.

6. The process of claim 5 wherein said gas is fission-product krypton at a pressure of at least 10 millimeters of mercury.

7. The process of claim 5 wherein said gas is radon.

References Cited

UNITED STATES PATENTS

| | | | |
|---|---|---|---|
| 2,856,551 | 10/1958 | Lynch | 313—54 |
| 2,953,684 | 9/1960 | MacHutchin et al. | 313—54 X |
| 2,980,819 | 4/1961 | Feaster | 310—4 |
| 3,018,376 | 1/1962 | Vanderschmidt | 313—54 X |
| 3,019,358 | 1/1962 | Ohmart | 313—54 X |
| 3,028,490 | 4/1962 | Quilleux | 313—54 X |
| 3,054,914 | 9/1962 | Hatsopoulos et al. | 310—4 |
| 3,093,567 | 6/1963 | Jablonski | 310—4 X |
| 3,119,059 | 1/1964 | Hall | 310—4 X |
| 3,202,843 | 8/1965 | Hurst | 310—4 |

FOREIGN PATENTS

| | | |
|---|---|---|
| 797,872 | 7/1958 | Great Britain. |

OTHER REFERENCES

Journal of Applied Physics, December 1959, pp. 2017 and 2018.

Soviet J. of Atomic Energy, March 1961, vol. 7, No. 5, pp. 960–962.

MILTON O. HIRSHFIELD, *Primary Examiner.*

REUBEN EPSTEIN, ORIS L. RADER, DAVID X. SLINEY, *Examiners.*